United States Patent Office 3,517,654
Patented June 30, 1970

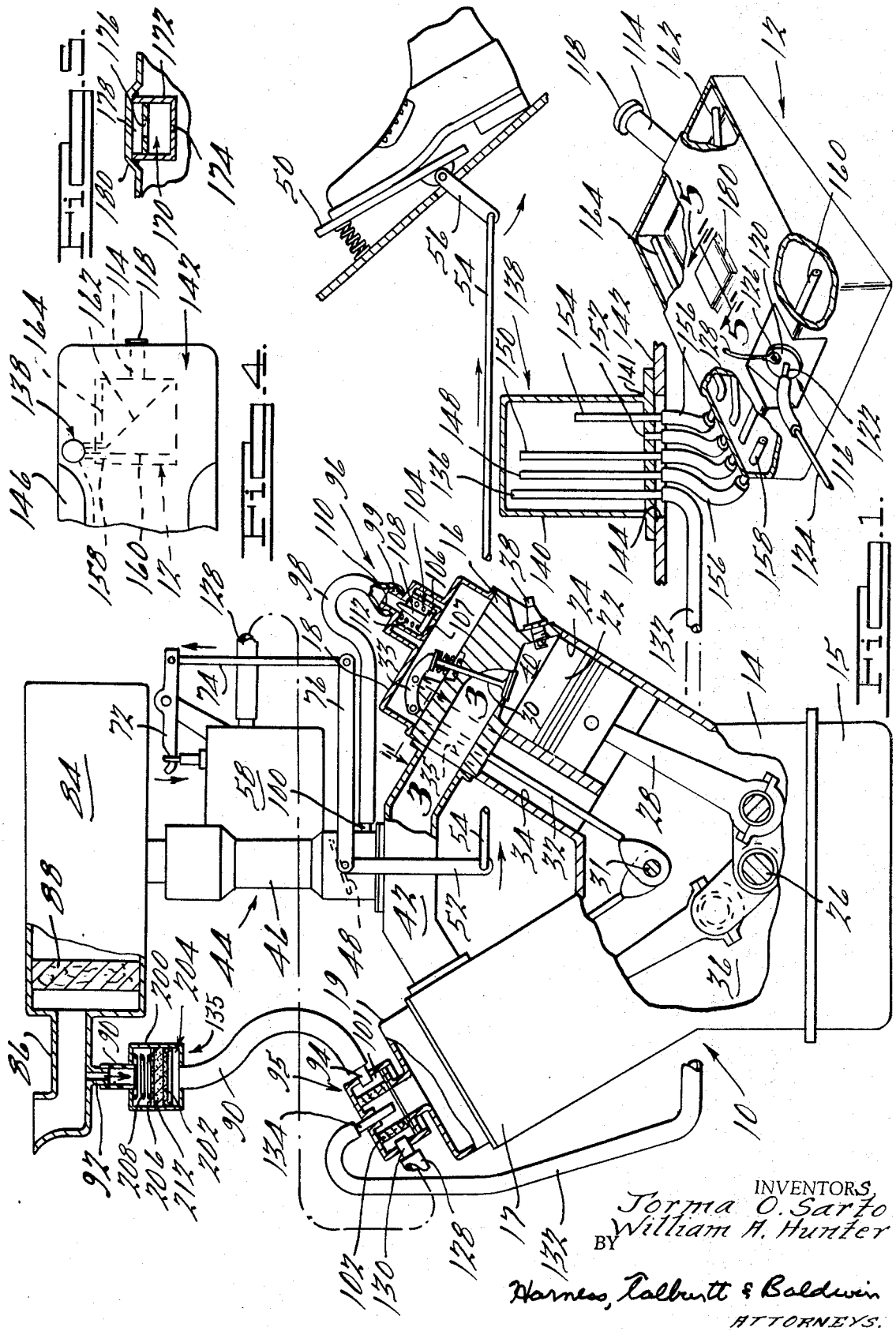

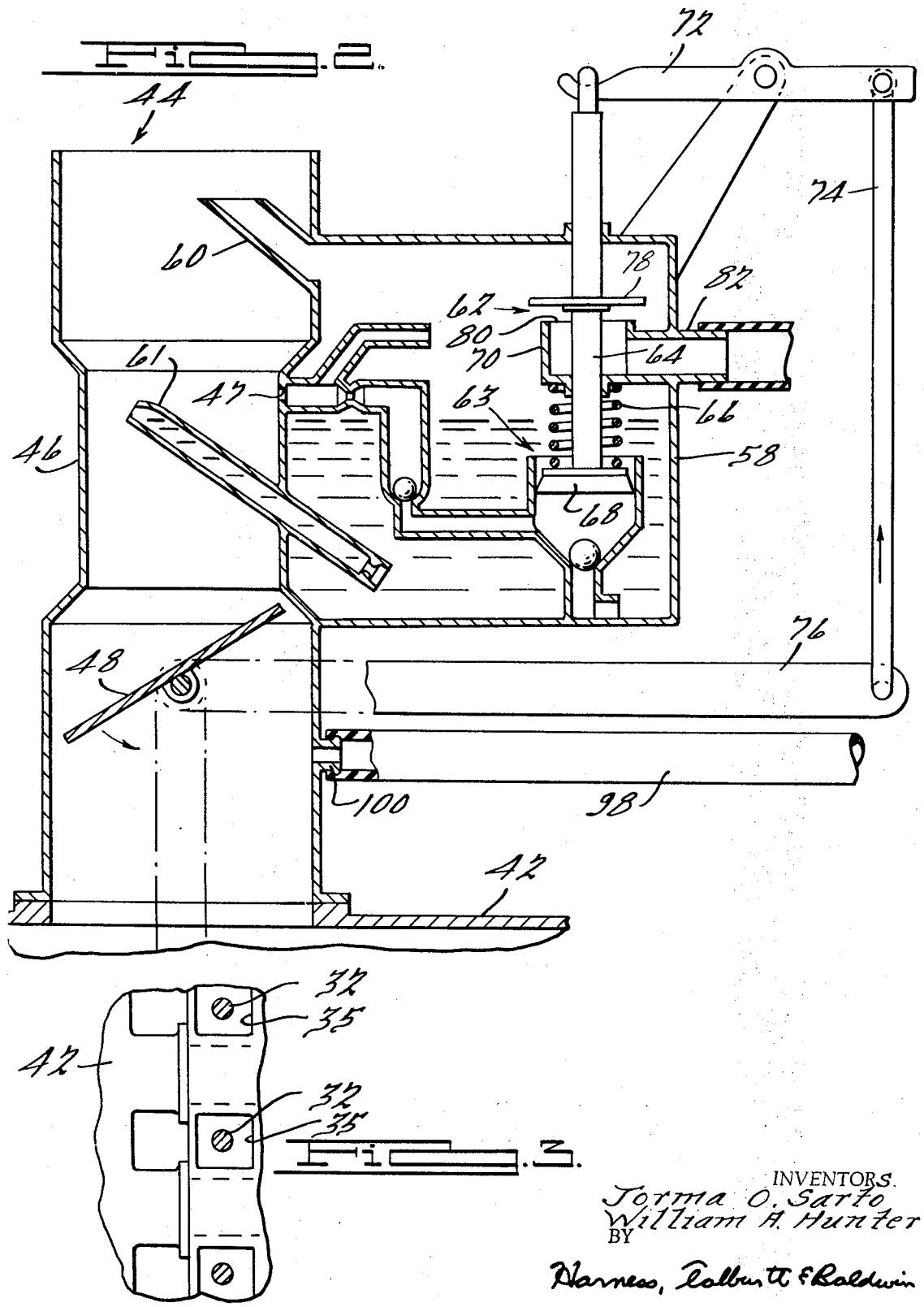

3,517,654
EVAPORATIVE EMISSION CONTROL SYSTEM
Jorma O. Sarto, Orchard Lake, and William A. Hunter, Royal Oak, Mich., assignors to Chrysler Corporation, Highland Park, Mich., a corporation of Delaware
Filed Mar. 8, 1968, Ser. No. 711,680
Int. Cl. F02m 37/00
U.S. Cl. 123—136                8 Claims

ABSTRACT OF THE DISCLOSURE

A system for controlling evaporative emissions from the fuel system of a motor vehicle wherein the fuel tank and carburetor bowl are vented to the crankcase of the engine so that the crankcase serves as an accumulator to collect fuel vapors from the fuel tank and fuel bowl while the engine is turned off; the crankcase is in turn vented to the engine intake so that the collected vapors are subsequently burned in the engine during subsequent operation of the engine.

BACKGROUND OF THE INVENTION

This invention relates to an evaporative control system for a motor vehicle fuel system.

The atmospheric condition commonly referred to as "smog" has generated considerable interest in the problem of polluting emissions from automobiles. Many corrective devices and systems have been proposed and/or utilized to control and at least partially eliminate the fumes from the engine exhaust. Another, and quite distinct, source of hydrocarbon emissions from the automobile is the fuel vapor escaping from the fuel system. Specifically, significant quantities of gasoline vapor escape from the external vents of both the fuel tank and the carburetor fuel bowl. Various proposals have been advanced to control these evaporative emissions. While some of the proposed systems have successfully controlled the evaporative emissions, they have been prohibitively expensive and complicated, either from an initial cost standpoint or from a maintenance standpoint.

SUMMARY OF THE INVENTION

The primary object of the present invention is to provide an improved evaporative emission control system for a motor vehicle.

A more specific object is to provide an evaporative emission control system for a motor vehicle which will be simpler and less expensive, both in initial cost and maintenance, than known systems of comparable effectiveness.

In the evaporative emission control system of the invention, the fuel tank and carburetor fuel bowl are both vented to the crankcase of the engine. When the engine is turned off, the vapors emitting from the fuel tank and fuel bowl are routed to the crankcase which serves as an accumulator to collect these vapors. The emissions entering the crankcase, being heavier than the air in the crankcase, gradually and progressively displace the air in the crankcase. Provision is made to route the collected vapors from the crankcase to the engine intake manifold when the engine is again started so that the collected vapors may be internally combusted in the engine.

In the specific form of the invention disclosed, two vent tubes are connected to the crankcase breather cap of the engine. One vent tube communicates with the vent of the carburetor fuel bowl and the other tube communicates with a vent in the fuel tank. Both vent tubes communicate through the breather cap with the engine crankcase so that the breather cap provides storage communication between the crankcase and both the fuel bowl and the fuel tank. The disclosed embodiment also includes novel means to ensure vapor communication between the fuel tank and the crankcase in all attitudes and operating conditions of the vehicle.

Other objects, features and advantages of the invention will be apparent from the detailed description to follow.

BRIEF DESCRIPTION OF THE DRAWINGS

A preferred embodiment of the invention is illustrated in the accompanying drawings. In the drawings:

FIG. 1 is a fragmentary, partially schematic view of an evaporative emission control system according to the invention;

FIG. 2 is a sectional view on an enlarged scale of the carburetor assembly of the system of FIG. 1;

FIG. 3 is a sectional view taken on line 3—3 of FIG. 1;

FIG. 4 is a schematic fragmentary view of the luggage compartment of a motor vehicle embodying the emission control system of the invention; and FIG. 5 is a fragmentary sectional view taken on line 5—5 of FIG. 1.

DETAILED DESCRIPTION OF THE PREFERRED EMBODIMENT

The emission control system of the invention is seen in FIG. 1 in conjunction with a gasoline internal combustion engine 10 and a fuel tank 12.

Engine 10 is of the so-called V-eight type and includes a block 14, oil pan 15, heads 16, 17, and valve covers 18, 19. Pistons 22 slidably received in cylinders 24 are drivingly connected to crankshaft 26 through connecting rods 28. Valves 30 selectively control the intake to and exhaust from cylinders 24 with the selective opening and closing movement of the valves controlled in known manner by a cam shaft 31 engaging lifters 32 for actuation of rocker arms 33. Lifters 32 (see also FIG. 3) move within aligned passages 34 and 35 in block 14 and heads 13, 16, aligned passages 34 and 35 thereby providing vapor communication between crankcase 36 and valve covers 18, 19. Spark plugs 38 function in known manner to ignite the combustible mixtures introduced into combustion chambers 40 through intake manifold 42.

A carburetor 44 (see also FIG. 2) is carried by manifold 42 and functions to deliver combustible charge material to the cylinders. Carburetor 44 is generally of known form and includes a venturi section 46, a throttle 48 controlled from accelerator pedal 50 by a throttle linkage 52, 54, 56, a fuel bowl 58, a bowl balance tube 60, a main fuel discharge tube 61 and a vent valve 62. The usual accelerator pump assembly 63 is provided within the fuel bowl; pump assembly 63 functions in known manner in response to a downward stroke of piston rod 64 to squirt a measured quantity of fuel into carburetor venturi section 46 through aperture or "window" 47. The working stroke of piston rod 64 is effected by a coil spring 66 compressed between piston 68 and the lower face of the body 70 of carburetor vent valve 62. The return stroke of piston rod 64 is effected by a linkage 72, 74, 76 operatively connected to the throttle linkage. A valve disc 78 on piston rod 64 coacts with a valve seat 80 defined by valve body 70 to selectively communicate the interior of the fuel bowl to vent fitting 82 in response to reciprocal movement of rod 64.

An air cleaner 84 of known form is carried on top of carburetor 44 and includes an intake horn 86 and a filter element 88.

Engine 10 also includes a positive crankcase ventilation system. The positive crankcase ventilation system includes a hose 90 extending between a fitting 92 on horn 86 and a fitting 94 on the annular periphery of a breather cap 95, a crankcake ventilation valve 96 on valve cover 18, and a hose 98 extending between a fitting 99 on valve 96 and a fitting 100 on the base of carburetor 44. Fitting 94 communicates with an annular chamber 101 defined between the side wall of the cap and an annular filter element 102 positioned within the cap. Hose 90 thus provides vapor communication between the air inlet of horn 86 and the crankcase 36 of the engine. Valve 96 includes a spool 104 having a base portion 106 for seating coaction with an aperture 107 in the valve housing and a conical portion 108 for throttling coaction with a port 110 defined at the base of fitting 100. A coil spring 112 acts to normally maintain spool base portion 106 in seating engagement with the valve housing to preclude communication between crankcase 36 and carburetor 44.

Fuel tank 12 includes a filler pipe 114 and a sending unit 116. Pipe 114 is of known form and includes a cap 118. Sending unit 16 may be any of several known constructions; it includes a plug member 20 carrying a fitting 122 for connection to an electrical wire 128. Fuel line 124 extends to a fuel pump (not shown) which is in turn communicated with carburetor 44. Fitting 122 communicates with a syphon hose positioned inside tank 12 and terminal 126 is electrically connected to a rheostat assembly positioned inside the tank.

According to the invention, both the fuel tank and the carburetor fuel bowl are vented to the engine crankcase. Specifically, a carburetor vent host 128 extends from carburetor vent fitting 82 to a fitting 130 press fitted into the side wall of breather cap 95, and a fuel tank vent hose 132 extends generally from the fuel tank to a fitting 134 centrally press fitted into the top wall of the breather cap and extending downwardly therein within annular filter element 102. It will be noted that hoses 90, 128, and 132 all connect with a common cap member 95. It is contemplated that this breather cap member would be mounted on the adjacent mouth or spout on the valve cover with a tight, resiliently sealing, but removable fit and that a separate oil filler cap (not shown) would be provided to allow addition of lubricating oil to the crankcase. Cap 95 serves only as a connector for the various vent and breather hoses and therefore need not be removed during the normal operation and servicing of the vehicle.

When engine 10 is operating under a steady state or cruise condition, carburetor vent valve 62 is closed by valve disc 78, fuel tank 12 is vented to the crankcase through vent hose 132, and blow-by is entering the crankcase around pistons 22; crankcase ventilation valve 96 is maintained at this time in a throttling condition by the interaction of intake manifold vacuum and valve spring 142. Specifically, base portion 106 of valve spool 104 is lifted clear of aperture 107 and conical portion 108 defines an annular throttling orifice with port 110 with the size of the orifice increasing with increasing engine speed because of the diminishing magnitude of the manifold vacuum with increasing engine speed. Under these conditions, the evaporative emissions entering the crankcase from the fuel tank through vent hose 132 and the blow-by products entering the crankcase around the pistons are constantly vented from the crankcase through ventilation valve 96 and enter the intake manifold from where they are routed to the engine cylinders for combustion. Purging air continuously enters the crankcase at this time through air cleaner horn 86, hose 90, and breather cap 95; this air flows through the crankcase where it picks up contaminants and thereafter leaves the crankcase through ventilation valve 96 along with the evaporative emissions and the blow-by products.

When the engine is thereafter turned off, the invention evaporative emission control system functions to allow the crankcase to serve as a collector for the evaporative emissions from the fuel tank and the carburetor fuel bowl. Specifically, when the engine is shut off, vent hose 132 continues to vent the fuel tank to the crankcase, and carburetor vent valve 62 is opened by the return spring of the throttle linkage to vent the carburetor fuel bowl to the crankcase through hose 128. The evaporative emissions from the fuel tank and the carburetor fuel bowl during shut down or "hot soak" conditions are thus routed to the crankcase where they are stored. The emissions are precluded from leaving the crankcase by the ventilation valve 96 which is now closed by the action of spring 112. As the emissions, which are heavier than air, enter the crankcase, they gradually and progressively displace the air in the crankcase; the displaced air leaves the crankcase through the breather cap, air hose 90, and air cleaner horn 86. The capacity of the crankcase, valve covers, and connecting passages is quite large relative to the volume of emissions generated by the fuel tank and fuel bowl during typical shut down conditions so that the storage volume provided is normally more than adequate to handle the emissions. If the storage capacity is exceeded, as for example due to a long shut down under rising temperature conditions, the emissions in excess of the storage capacity leave the crankcase through the breather cap 95 and air hose 90, and are trapped in a charcoal cannister 135 interposed in hose 90. Cannister 135 includes a cylindrical casing 200 receiving hose 90 at its opposite ends, a lower screen 202 secured to the side wall of the casing and defining with the casing a lower plenum chamber 204, an upper screen 206 slidably mounted in the casing and defining with the casing on upper plenum chamber 208, and a coil spring 210 urging screen 206 downwardly to compress a quantity of granulated activated charcoal 212 between screens 202 and 206. The activated charcoal in cannister 135 functions in known manner to absorb the evaporative emissions and preclude their discharge into the atmosphere through horn 86. When the engine is started up following a shut down, the ventilation valve 96 opens immediately to vent the accumulated evaporative emissions in the crankcase through hose 98 to the intake manifold for combustion in the engine. As the evaporative emissions leave the crankcase, fresh air is drawn into the crankcase through air line 90 to purge the crankcase; if the crankcase capacity has been exceeded during the preceding hot soak cycle so that charcoal cannister 135 has been required to absorb evaporative emissions in excess of crankcase capacity, the fresh air being drawn in through horn 86 and hose 90 will purge the cannister which yields all or at least a major portion of its absorbed emissions to the fresh air in a desorption process. The fresh air passing through hose 90 carries the desorption product through the crankcase and through the ventilation valve for combustion in the engine.

The invention also includes provision for ensuring that vapor communication will always be maintained between fuel tank vent line 132 and the vapor in the fuel tank irrespective of the attitude of the tank and/or the existent climatic conditions, thereby preventing liquid fuel carryover into the crankcase.

As best seen in FIG. 1, vent line 132 does not communicate directly with the fuel tank but rather is fitted onto the lower end of a vent tube 136 positioned within a standpipe 138. Standpipe 138 includes an upstanding pipe portion 140 having a closed upper end, and a base portion 141 in which vent tube 136 is press fitted. Standpipe 138 is positioned on the floor 142 of the luggage compartment of the vehicle with base portion 141 overlying and closing an opening 144 in floor 142 to allow tube 136 to extend downwardly through opening 144 for connection to vent line 132. Standpipe 138 is preferably positioned in the luggage compartment immediately rearwardly of a wheel housing 146 as best shown in FIG. 4. In addition to vent tube 136, standpipe 138 also houses vent tubes 148, 150, 152 and 154, each passing at its lower end with a press fit through the base portion 141 as shown in FIG. 1.

Hoses 156 connect vent tubes 148, 150, 152 and 154 with a plurality of horizontal vent tubes suitably positioned within the fuel tank. Specifically, standpipe vent tube 148 is connected to fuel tank vent tube 158 opening in the right front corner of the fuel tank, standpipe vent tube 150 is connected to fuel tank vent tube 160 opening in the left front corner of the fuel tank, standpipe vent tube 152 is connected to fuel tank vent tube 162 opening in the left rear corner of the fuel tank, and standpipe vent tube 154 is connected to fuel tank vent tube 164 opening in the right rear corner of the fuel tank. It will be noted that vent tube 136 extends almost the full height of the standpipe, vent tubes 148 and 150 are of equal height and extend to a level just below that of tube 136, vent tube 152 is cut off substantially flush with the upper face of standpipe base portion 141, and vent tube 154 extends to about half the height of tubes 148 and 50. The standpipe is preferably positioned substantially over the fuel tank vent tubes where the latter emerge from the fuel tank. Thus, in the disclosed embodiment where the fuel tank vent tubes emerge from the fuel tank adjacent the right front corner of the tank, the standpipe is positioned at the right hand side of the luggage compartment behind the right hand wheel housing as can be seen in FIG. 4.

The disclosed vent tube and standpipe arrangement will be seen to preclude liquid carryover from the fuel tank to the crankcase. Specifically, since a vent tube is provided in each corner of the tank, at least one vent tube will always be in communication with the vapor in the tank above the liquid fuel irrespective of the attitude of the vehicle and/or inertia forces generated by maneuvering of the vehicle. For example, if the vehicle is parked on a downhill attitude, rear vents 162, 614 communicate with the vapor in the tank to establish the vapor communication with the crankcase. However, liquid fuel is often trapped in the rear vent tubes due to sloshing, maneuvering, etc., so that, with the vehicle parked in a downhill attitude, the rear vent tubes must be purged of liquid before the vapor can escape to the crankcase. As the fuel in the tank vaporizes due to heating of the fuel in response to increasing ambient temperatures, a vapor pressure is created in the tank. Since the crankcase and thus the standpipe are at atmospheric pressure, any increase in the tank pressure creates a pressure differential as between the tank and the standpipe corresponding to a head of fuel $h$. A head of fuel $h$ is thus created in the standpipe vent tubes. In the front standpipe vent tubes 148, 150, this head $h$ appears as a full head above the level of the fuel in the tank since the associated fuel tank vent tubes 158, 160 have their openings submerged due to the downward slope of the tank. In the rear standpipe vent tubes, this head appears as a head $h/2$ above the level of the fuel in the tank since the combined vent tubes 164–154, for example, act in the downhill attitude of the vehicle as a manometer with the vapor in fuel tank vent tube 164 pushing against and counterbalancing the column of trapped fuel in standpipe vent tube 154. It will be apparent that the vapor cannot escape through tubes 154–164 until the trapped fuel is completely purged from fuel tank vent tube 164 into standpipe vent tube 154. Since the head of fuel rises twice as fast in the front standpipe vent tubes as in the rear standpipe vent tubes, it is imperative that the distance from the lowest point of the rear fuel tank vent tube to the level of the fuel in the tank be less than half the distance from the level of the fuel in the tank to the top of standpipe vent tubes 148 and 150 in order to avoid having liquid spill over from standpipe vent tubes 148 and 150 before the vapor can escape to the crankcase through the rear standpipe vent tubes. Accordingly, standpipe vent tubes 148, 150 are arranged to have a height greater than twice the height of standpipe tube 154. A similar manometer effect occurs in combined vent tubes 162–152 when the vehicle is parked on the right hand side of a crowned road since fuel tank vent tube 162 is now vented to the vapor in the tank while fuel tank vent tube 164 is submerged in the liquid with the result that the vapor pressure head rises twice as fast in the standpipe vent tube 154 as in standpipe vent tube 152. Standpipe vent tube 154 is accordingly designed to have an effective height of more than twice that of standpipe vent tube 152 to allow vapor to purge out of tube 152 before liquid fuel spills over into the standpipe through tube 154. Any liquid that does spill over into standpipe 138 as a result of the above described purging actions will subsequently drain back into the fuel tank through standpipe vent tube 152.

In order to ensure that some thermal expansion space will always remain above the liquid fuel in the tank and thereby ensure that at least one fuel tank vent tube will have vapor communication, an auxiliary chamber 170 is provided in the fuel tank. As best seen in FIG. 5, chamber 170 is defined by a partition 172 formed integrally within the fuel tank. Chamber 170 is sealed from the remainder of the fuel tank except for a tiny bleed aperture 174 in its lower wall and a larger bleed aperture 176 in its upper wall; aperture 176 communicates with a passageway 178 which is defined beneath an external bulge 180 in the top wall of the tank. Passageway 178 is open at both ends for communication with the main portion of the fuel tank. Even if the tank is filled by an attendant to the very top, gasoline will thereafter bleed through aperture 174 into chamber 170 to lower the level of the fuel in the tank and provide a vapor space above the fuel. The air in chamber 170 displaced by the entering gasoline leaves through aperture 176.

It will be seen that the disclosed system provides an inexpensive and effective means for recovering and eliminating evaporative emissions. The disclosed system is inexpensive not only in terms of initial cost but also in terms of upkeep since it utilizes existing storage capacity rather than artificially, and expensively, created capacity.

Although a preferred embodiment of the invention has been illustrated and described in detail, it will be apparent that various changes and modifications may be made in the disclosed embodiment without departing from the scope or spirit of the invention as defined by the appended claims.

We claim:

1. In a power system for a motor vehicle including an internal combustion engine having at least one combustion chamber and a crankcase, a fuel tank for storing a volatile fuel, and a charge delivery system including a carburetor having a throttle valve and a fuel bowl and an air intake conduit defined in part by said carburetor and communicating with the combustion chamber; an evaporative emission control system comprising:
 (A) first conduit means extending between said fuel tank and said crankcase, whereby to allow said crankcase to function as an accumulator to collect vapor evaporating from said fuel tank;
 (B) second conduit means extending between said fuel bowl and said crankcase;
 (C) a control valve in said second conduit means;
 (D) means operative in response to movement of said throttle valve to selectively open and close said control valve, whereby to allow said crankcase to function under selected throttle conditions as an accumulator to collect vapor evaporating from said fuel bowl;
 (E) third conduit means extending between said crankcase and said air intake conduit at a location therein downstream of said throttle valve, whereby to allow the vapor accumulated in said crankcase to be supplied to said intake conduit for delivery to said combustion chamber, and
 (F) said first conduit means includes means operative to preclude carryover of liquid fuel to said crankcase irrespective of the attitude or maneuvering of said vehicle and irrespective of changes in climatic conditions.

2. In a power system for a motor vehicle including an internal combustion engine having at least one combustion chamber and a crankcase, a fuel tank for storing a volatile fuel, and a charge delivery system including a carburetor having a throttle valve and a fuel bowl and an air intake conduit defined in part by said carburetor and communicating with the combustion chamber; an evaporative emission control system comprising:

(A) first conduit means extending between said fuel tank and said crankcase, whereby to allow said crankcase to function as an accumulator to collect vapor evaporating from said fuel tank;

(B) second conduit means extending between said fuel bowl and said crankcase;

(C) a control valve in said second conduit means;

(D) means operative in response to movement of said throttle valve to selectively open and close said control valve, whereby to allow said crankcase to function under selected throttle conditions as an accumulator to collect vapor evaporating from said fuel bowl;

(E) third conduit means extending between said crankcase and said air intake conduit at a location therein downstream of said throttle valve, whereby to allow the vapor accumulated in said crankcase to be supplied to said intake conduit for delivery to said combustion chamber; and (F) said first conduit means includes a plurality of vent tubes opening at selectively spaced locations in said fuel tank.

3. An evaporative emission control system according to claim 2 wherein:

(G) said first conduit means further includes a standpipe, a plurality of standpipe tubes positioned within said standpipe, and a conduit extending between said crankcase and one of said standpipes; and (H) said vent tubes each communicate with a respective one of the remaining standpipe tubes.

4. An evaporative emission control system according to claim 3 wherein:

(I) a first vent tube as aforesaid opens adjacent one side of the tank;

(J) a second vent tube as aforesaid opens adjacent an opposite side of the tank;

(K) said standpipe is located adjacent said one side of said tank; and (L) the standpipe tube associated with said first vent tube is higher than the standpipe tube associated with said second vent tube to allow for the manometer effect of liquid trapped in said second vent tube when said other tank side is elevated relative to said one tank side.

5. An evaporative emission control system according to claim 4 wherein:

(I) said fuel tank is generally rectangular;

(J) a vent tube as aforesaid opens in each corner of said fuel tank;

(K) said standpipe is located adjacent one end of said fuel tank; and (L) the standpipe tubes associated with the vent tubes at the two corners of said tank at said one tank end are higher than the standpipe tubes associated with the vent tubes at the two corners at the other tank end.

6. An evaporative emission control system according to claim 5, wherein:

(M) said standpipe is located adjacent one lateral side of said fuel tank; and (N) of the two standpipe tubes associated with the two vent tubes at the other end of said tank, the standpipe tube associated with the vent tube at said one lateral side edge is the highest.

7. An evaporative emission control system according to claim 3 wherein:

(I) said standpipe upstands from the floor of the luggage compartment of said vehicle.

8. An evaporative emission control system according to claim 7 wherein said standpipe is positioned in said luggage compartment immediately rearwardly of one of the wheel housings.

References Cited

UNITED STATES PATENTS

| | | | |
|---|---|---|---|
| 2,316,882 | 4/1943 | Moseley et al. | 261—72 |
| 2,851,259 | 9/1958 | Olson | 261—72 XR |
| 2,894,734 | 7/1959 | Wentworth | 261—72 XR |
| 2,894,736 | 7/1959 | Wentworth | 261—72 |
| 3,093,124 | 6/1963 | Wentworth | 123—136 |
| 3,172,348 | 3/1965 | Berg | 98—2 |
| 3,191,587 | 6/1965 | Hall | 123—136 |
| 3,221,724 | 12/1965 | Wentworth | 123—136 |

LAURENCE M. GOODRIDGE, Primary Examiner

U.S. Cl. X.R.

123—119, 122